(12) United States Patent
Michaelian et al.

(10) Patent No.: US 11,039,049 B2
(45) Date of Patent: Jun. 15, 2021

(54) CONFIGURABLE AND ADJUSTABLE VIDEO CONFERENCING APPARATUS

(71) Applicant: DOLBY LABORATORIES LICENSING CORPORATION, San Francisco, CA (US)

(72) Inventors: Peter Michaelian, San Francisco, CA (US); Christine Anna Livaudais, San Francisco, CA (US); David Clementson, Palo Alto, CA (US); Carl Stephen Dizon Tubis, San Pablo, CA (US); Timothy David Burkhard, Roseville, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 92 days.

(21) Appl. No.: 16/294,849

(22) Filed: Mar. 6, 2019

(65) Prior Publication Data

US 2019/0281198 A1    Sep. 12, 2019

Related U.S. Application Data

(60) Provisional application No. 62/639,772, filed on Mar. 7, 2018.

(51) Int. Cl.
*H04N 5/225* (2006.01)
*H04N 7/18* (2006.01)

(52) U.S. Cl.
CPC ......... *H04N 5/2253* (2013.01); *H04N 5/2252* (2013.01); *H04N 5/225251* (2018.08); *H04N 7/18* (2013.01)

(58) Field of Classification Search
None
See application file for complete search history.

(56) References Cited

U.S. PATENT DOCUMENTS

| | | | |
|---|---|---|---|
| 6,370,741 B1 * | 4/2002 | Lu | A47B 21/045 24/523 |
| 6,663,066 B1 * | 12/2003 | Hong | F16M 13/02 248/231.41 |
| 6,679,463 B1 * | 1/2004 | Chen | F16M 13/00 248/126 |
| 6,738,094 B1 | 5/2004 | Minami | |
| 6,845,954 B1 | 1/2005 | Moayer | |
| 7,093,811 B2 * | 8/2006 | Wu | G03B 17/02 248/229.12 |

(Continued)

FOREIGN PATENT DOCUMENTS

JP    2002-027286    1/2002

*Primary Examiner* — Cynthia Segura

(57) ABSTRACT

A hub and a camera mount configured to support a video camera. The camera mount and hub are detachably mountable with respect to each other in any of at least two different configurations, preferably with adjustability in at least one configuration. In some embodiments, the camera mount includes a first structure including a retainer and camera support, a slide translatably mounted to the first structure, and a foot having a first end pivotably attached to the slide. The retainer is shaped to engage a surface of an object to which the camera mount is to be mounted. Other aspects are a camera mount, and a camera mount alone. Optionally, in one configuration the hub is mountable to a wall or other surface.

15 Claims, 12 Drawing Sheets

(56) References Cited

U.S. PATENT DOCUMENTS

| | | | |
|---|---|---|---|
| 7,431,253 B2 * | 10/2008 | Yeh | G06F 1/1607 |
| | | | 248/181.1 |
| 7,572,073 B2 | 8/2009 | Kenoyer | |
| D600,730 S | 9/2009 | Su | |
| D643,456 S | 8/2011 | Won | |
| D650,408 S * | 12/2011 | Kim | D16/202 |
| 8,475,059 B2 * | 7/2013 | Khamsepoor | H04N 5/2251 |
| | | | 396/428 |
| 9,525,911 B2 * | 12/2016 | Atkin | H04N 21/8358 |
| 9,693,015 B2 * | 6/2017 | McArdell | H04N 7/15 |
| 10,122,900 B2 * | 11/2018 | Liu | G03B 17/561 |
| D872,158 S * | 1/2020 | Bytyqi | D16/202 |
| 2005/0231587 A1 | 10/2005 | Root | |
| 2009/0008521 A1 * | 1/2009 | Lee | F16M 13/022 |
| | | | 248/226.11 |
| 2010/0134635 A1 | 6/2010 | Teppan | |
| 2011/0243548 A1 | 10/2011 | Khamsepoor | |
| 2015/0138304 A1 * | 5/2015 | McArdell | H04N 7/15 |
| | | | 348/14.07 |
| 2018/0103183 A1 * | 4/2018 | Liu | H04N 5/2253 |

* cited by examiner

CONFIGURABLE AND ADJUSTABLE VIDEO CONFERENCING APPARATUS

CROSS-REFERENCE TO RELATED APPLICATIONS

This patent application claims the benefit of priority to U.S. Patent Application No. 62/639,772 filed Mar. 7, 2018, which is hereby incorporated by reference in its entirety.

TECHNICAL FIELD

The invention pertains to video conferencing apparatus (e.g., a video camera mount, a video camera, and a processor for processing conference data) useful during a video conference. In typical embodiments, the apparatus is or includes a camera mounting subsystem (and optionally a video camera or an element thereof) configured to be mounted in any of multiple configurations (e.g., mounted in one configuration to a processor or another device or surface, and in another configuration mounted with a processor to a monitor), preferably with adjustability in at least one configuration.

BACKGROUND

It is often desirable to set up and use video conferencing apparatus, including at least one video camera, in an environment including a display device (e.g., a TV, computer monitor, or other device capable of displaying video). For simplicity, any such display device will referred to generally herein as a "monitor." It is often desirable for the video conferencing apparatus to be set up in any selected one of multiple configurations, e.g., with a video camera perched on the monitor, or with a video camera on a table (or other non-vertical surface), or with a video camera mounted to a wall (or another vertical, or generally vertical, surface). The characteristics of the video conferencing environment may be unknown in advance. For example, it may be desired that the video conferencing apparatus be set up and used in a sequence of different environments (e.g., different huddle spaces in a workplace) each having different characteristics which may be unknown in advance.

Thus, the inventors have recognized that there is a need for video conferencing apparatus which includes a camera mounting subsystem which is configurable and/or adjustable, so as to allow the entire conferencing apparatus (or at least one element thereof) to be stably mounted to (e.g., with a video camera, or both a video camera and a processor, perched on) any of a number of different monitors and/or to be stably mounted to any of a variety of other devices (e.g., a processor) or surfaces (e.g., with the apparatus or elements thereof, e.g., a video camera or a video camera and a processor, resting on a table or mounted to a wall), preferably in a configurable and easily adjustable manner (e.g., in any of multiple configurations, with easy adjustability in at least one configuration).

It is known to mount (e.g., perch) a video camera on a monitor, with freedom for the camera to pivot up and down (and/or to pan sideways) relative to the monitor. However, the inventors have recognized that conventional apparatus for so mounting a video camera typically lacks adjustability (for use with monitors having any of a variety of different shapes and/or sizes) and/or fails to provide both mount stability and ease of set up. For example, the inventors have recognized that one such conventional apparatus includes a combined video camera and processor (a video camera integrated with a processor) having a center of gravity which is high, relative to a monitor to which it can be mounted, and thus lacks stability when mounted to the monitor. In contrast, a typical embodiment of the present invention is a video conferencing apparatus (including a video camera, and a processor, referred to herein as a "hub", implemented as a device separate from the camera) which is easily and adjustably mountable to a monitor (having any of a variety of different shapes and/or sizes), with elements of the apparatus (e.g., the hub, the camera, and a camera mount connecting them) having weight and position such that the center of gravity of the apparatus is low (relative to a monitor to which the apparatus is mounted) so as to provide good stability of the mounted apparatus.

The inventors have also recognized that there is a need for a video conferencing apparatus which is configurable to mount or position a video camera relative to a monitor in any of a number of different configurations, while allowing all cabling connected to the camera (and/or to a processor included in the apparatus but implemented separately from the camera) to be hidden (in each such configuration) from the front of the monitor and front of the camera. Together with this recognition, the inventors have recognized that if a video camera is mounted (in a manner so as not to be easily detachable, e.g., during use, from) to, or integrated with, a processor (as in some conventional conferencing apparatus), and cabling extends out from the camera and processor (or the integrated camera/processor), it may not be possible to hide the cabling from the front of the monitor and the front of the camera in each desirable position of the camera relative to the monitor (e.g., if the camera is separated from the monitor, the camera is mounted to the processor, and the camera is pivoted relative to the processor and monitor, at least one cable extending out from the camera may come into the field of view of a person viewing the front of the monitor). Thus, typical embodiments of the inventive conferencing apparatus include a video camera and a processor which is separate from the camera but mountable (e.g., adjustably), in an easily detachable manner, in any of a number of different configurations relative to the camera, so that the camera and processor can be positioned relative to a monitor in any of many different desirable positions, with any cabling extending out from the camera (and any cabling extending out from the processor) hidden from the front of the monitor and the front of the camera in each such position.

BRIEF DESCRIPTION OF THE INVENTION

In a first class of embodiments, the invention is an apparatus, including a camera mount (configured to support a video camera) and a hub. The hub is a processor (of a type defined hereinbelow) configured to perform video processing on the output of a video camera (typically, a video camera mounted to the camera mount) and optionally also to perform other processing (e.g., establishing a communication link with a remote conference server, and/or audio processing). The camera mount and the hub are configured to be detachably mountable (e.g., mounted so as to be easily detachable from each other, such as by manually releasing a spring-biased latch) together in any of at least two different configurations, preferably with adjustability in at least one of the configurations. The configurations may include a first configuration in which the camera mount (typically with a video camera mounted thereto) is adjustably (e.g., pivotably and translatably) mounted to the hub such that the apparatus (the camera mount and hub, and a video camera mounted to the mount) can be stably perched on a monitor having any of a number of different thicknesses (e.g., with the retainer portion engaged with the front of the monitor and the hub engaged with the back of the monitor). Typically in the first configuration, any cabling extending out from the camera and/or the hub is hidden from the front of the monitor and the front of the camera.

The configurations may also include a second configuration in which the camera mount is mounted (e.g., pivotably or otherwise adjustably) on the hub (e.g., so that the hub, and a video camera mounted to the camera mount, can be used with a monitor, mechanically separate from the camera, camera mount, and hub, with any cabling extending out from the camera and/or the hub hidden from the front of the monitor and the front of the camera).

Preferably, in the first configuration, the hub is easily detachable from the camera mount to place the apparatus in a third configuration (a separated configuration) in which neither one of the hub nor the camera mount mechanically supports the other one of the hub and the camera mount. In the third configuration, the hub can rest on a table (or other surface) and the hub can be used with the camera mount (e.g., resting on the same surface as the hub, or otherwise supported) and a camera supported by the camera mount.

Preferably, in each of the first configuration and the second configuration, an element of the camera mount (and a camera supported by the camera mount) is pivotable relative to the hub, and in the third configuration, a camera supported by the camera mount is pivotable relative to an element of the camera mount. Preferably, in the first configuration, the hub is translatable and pivotable relative to an element of the camera mount (and to a camera supported by the camera mount) so that the mount, with the hub mounted thereto, can be adjusted for mounting to (perching on) any of differently sized monitors, with the hub positioned relative to the camera mount to provide a low center of gravity (relative to the support point of the monitor on which the apparatus is perched) for stability.

Typically, the camera mount is conveniently detachable from, and re-attachable to, the hub. Optionally, a wall-mounting element is also included, for mounting the hub (and optionally the video camera mount attached thereto) to a wall or other surface. The inventors have recognized that, to prepare an environment for a video conference, where the environment includes a table (or another horizontal or substantially horizontal work surface, e.g., supporting a monitor and/or other equipment for use during the conference), it would often be desirable to remove a hub from the work surface and to hang the hub from (or otherwise mount the hub to) a wall (e.g., a wall behind a monitor). The ability to so mount (wall mount) a hub can provide a big advantage during video conferencing, especially in small rooms (e.g., by freeing up table space for alternative use during a conference).

In some embodiments, the inventive apparatus is or includes a video camera mount and a hub (configured as are the camera mount and hub of any embodiment described herein including a camera mount and hub) and a video camera mounted (or mountable) to the camera mount. Typically, the camera mount is attachable to (and easily detachable from and re-attachable to) the hub in any of multiple configurations (e.g., the camera mount can be forward-mounted or reverse-mounted to the hub), preferably with the camera (when mounted to the camera mount) being adjustable, relative to the hub and an element of the camera mount, in at least one of the configurations. In other embodiments, the inventive apparatus is a video camera mount (configured as the camera mount of any embodiment described herein including a camera mount). E.g., in some embodiments the camera mount is configured to be detachably (e.g., adjustably and easily detachably) attached to a hub in any of multiple configurations. In other embodiments, the inventive apparatus is or includes a video camera mount and a hub (configured as are the camera mount and hub of any embodiment described herein), and a video camera shell attached to (or integrally formed with) the camera mount.

In a class of embodiments, the inventive apparatus is (or includes) a video camera mount, said camera mount including:

a first structure, including a retainer portion (retainer) and camera supporting portion (camera support), where the retainer portion is shaped to engage a surface of an object (e.g., a monitor or a hub) to which the camera mount is to be mounted, and the camera supporting portion is configured to support a video camera to which the camera mount may be mounted;

a slide, translatably mounted to the first structure; and a foot, having a first end which is pivotably attached to the slide, said foot including a latch catch element which is spring-biased toward the slide, and a support structure, wherein the support structure is configured to support the latch catch element such that said latch catch element is displaceable away from the slide, relative to the support structure, by overcoming spring-biasing force exerted on the latch catch element.

The displaceable latch catch element, pivotable foot, and translatable slide are useful to allow a video camera and a hub (each mounted to the video camera mount, with the latch catch element locking the hub to the video camera mount) to be perched on monitors have any of a range of depths (with each monitor gripped between the retainer portion of the camera mount and the hub), and with the hub in a first angular orientation relative to the first structure (preferably such that the hub provides a low center of gravity, of the assembly comprising the camera mount and the camera and hub mounted thereto, relative to the monitor for stability, and preferably with all cabling extending out from the camera and hub being hidden behind the front of the camera and the front of the monitor). The pivotable foot, translatable slide, and displaceable latch catch element are also useful to allow the video camera mount (with the video camera mounted thereto) to be detached from the hub (e.g., when the hub is attached to the camera mount in a perch mode configuration in which the hub is in a first angular orientation and pivot configuration relative to the first structure) and re-attached to the hub (in a different configuration, e.g., a tabletop mode configuration) so that the camera mount (with the video camera mounted thereto) can be supported by the hub in the different configuration, with the hub in a second angular orientation and pivot configuration relative to the first structure, and with all cabling extending out from the camera and hub being hidden behind the front of the camera and the front of the hub.

In typical embodiments, the slide and the first structure implement a friction detent subsystem. Typically, the friction detent subsystem is configured to exert spring-biasing force which holds the slide, and thus the first end of the foot attached to the slide, in a user-determined position relative to the retainer portion of the first structure, with freedom for the slide to translate toward the retainer portion in response to a closing force sufficiently strong to overcome the spring-biasing force, and with freedom for the slide to translate away from the retainer portion in response to an opening force sufficiently strong to overcome the spring-biasing force.

Typically, the first structure defines racks, each of the racks including detents, the slide includes spring-biased pawls, the friction detent subsystem includes the racks and the pawls, and the pawls are pivotably attached to a main portion of the slide and spring-biased against the racks. Preferably, the racks include a first rack, and a second rack which is at least substantially parallel to the first rack, the pawls include a first pawl which is spring-biased against the first rack, and a second pawl which is spring-biased against the second rack. Preferably, the first pawl and the second pawl are shaped, positioned, and spring-biased so as to exert a net torque on the racks, to prevent the first structure from undesirably moving (e.g., vibrating or rattling) relative to the slide during use of the camera mount.

Also preferably, the first pawl has a first catch which is spring-biased to engage the first rack, the second pawl has a second catch which is spring-biased to engage the second rack, each of the detents of each of the racks has an asymmetrical shape, and each of the first catch and the second catch has a corresponding shape, such that the slide biases the first pawl and the second pawl against the racks asymmetrically in the sense that the minimum closing force sufficient to cause the slide to translate toward the retainer portion (to close the camera mount) is less than the minimum opening force sufficient to cause the slide to translate away from the retainer portion (to open the camera mount).

Preferably, the hub has a top surface, a front surface, and a rear surface, and includes a mount element (e.g., a bar extending from one side of the hub to an opposite side of the hub). The top surface and the mount element are shaped and positioned relative to each other to define a gap (a clearance space) between said top surface and said mount element. Also preferably, the hub has a rear tail portion which is laterally narrower than the rest of the hub. The gap should allow mounting of an embodiment of the inventive camera mount to the hub, with an element (e.g., a foot) of the camera mount extending through the gap. In some embodiments, the gap allows mounting of an embodiment of the inventive camera mount to the hub, with a foot of the camera mount extending through the gap and a latch catch element of the foot lockable against (and unlockable and removable from) the mount element.

NOTATION AND NOMENCLATURE

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform processing (e.g., pipelined processing) on audio or other sound data and/or video data, a programmable general purpose processor or computer, and a programmable microprocessor chip or chip set.

Throughout this disclosure including in the claims, the term "hub" is used to denote a processor which is configured to perform video processing on the output of a video camera. Optionally, a hub may also be configured to perform other processing (e.g., establishing a communication link with a remote conference server or other remote system or device, and/or audio processing). For example, a hub used for video conferencing applications may be coupled to receive video (output from a video camera during a video conference) and audio (captured during the conference), and may be configured to combine the video and audio (e.g., after performing processing on the received video and optionally also on the received audio) into an output bitstream, to assert the output bitstream to a communication link (for processing by a remote conference server), and to receive (from the communication link) conference audio and conference video (generated by the conference server). Typically, a hub used during a video conference is coupled by cabling to a video camera, an audio capture device, a monitor, and optionally also to one or more other devices.

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "couples" or "coupled" is used to mean either a direct or indirect connection. Thus, if a first device couples to a second device, that connection may be through a direct connection, or through an indirect connection via other devices and connections.

DETAILED DESCRIPTION OF THE PREFERRED EMBODIMENTS

Many embodiments of the present invention are technologically possible. It will be apparent to those of ordinary skill in the art from the present disclosure how to implement them.

Figure 10:
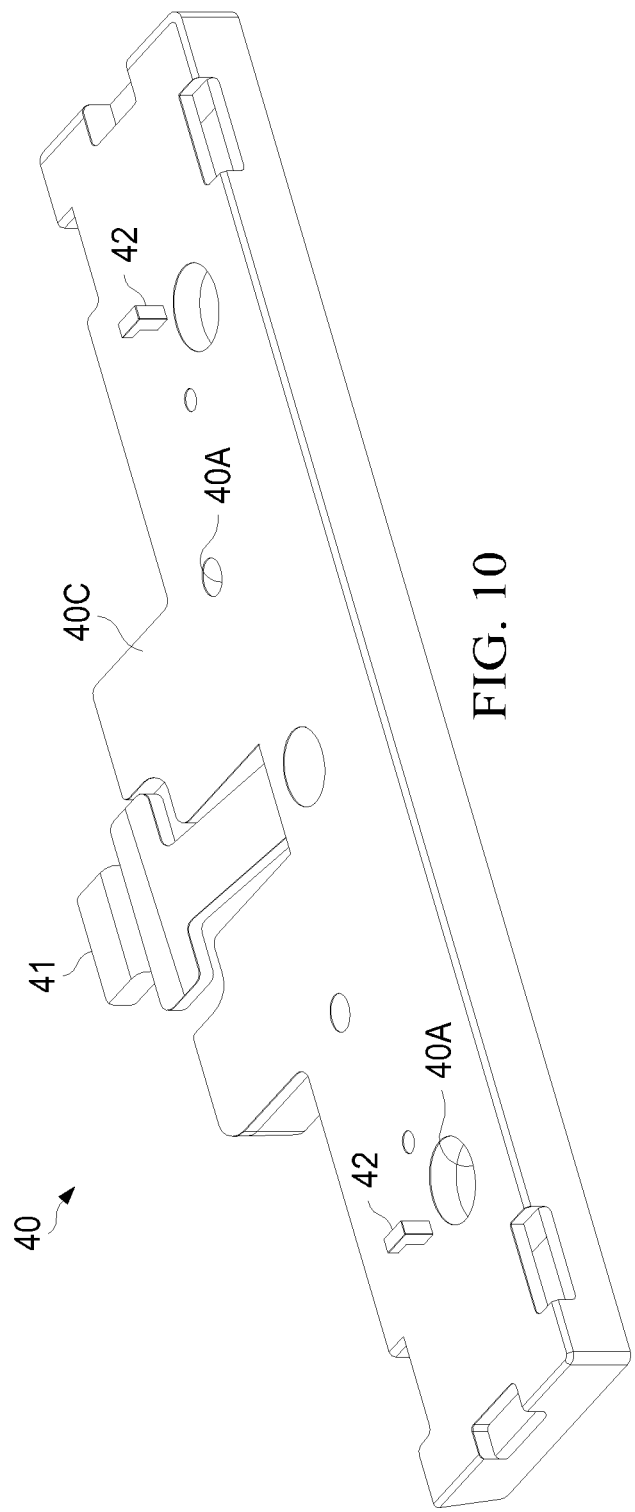
FIG. 10 is a perspective view of a wall plate of an embodiment of the inventive apparatus, showing the face of the wall plate to which a hub can be mounted.
Figure 11:
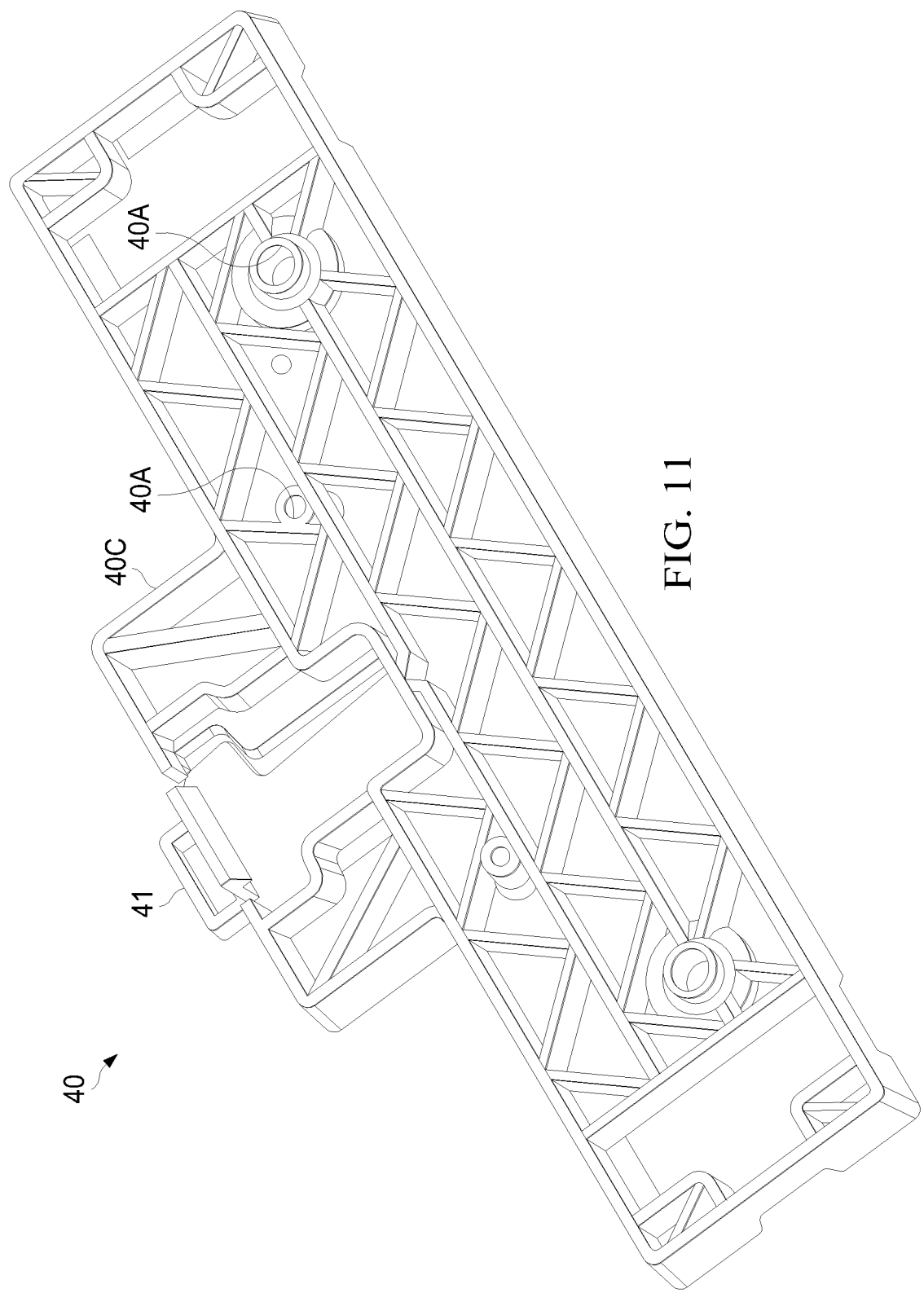
FIG. 11 is another perspective view of the wall plate of FIG. 10, showing the face of the wall plate which is not visible in FIG. 10.

Typical embodiments of the inventive apparatus will be described with reference to FIGS. 1-9. Each such embodiment optionally also includes a wall mount (e.g., wall mount 40 of FIGS. 10-12).

Figure 1:
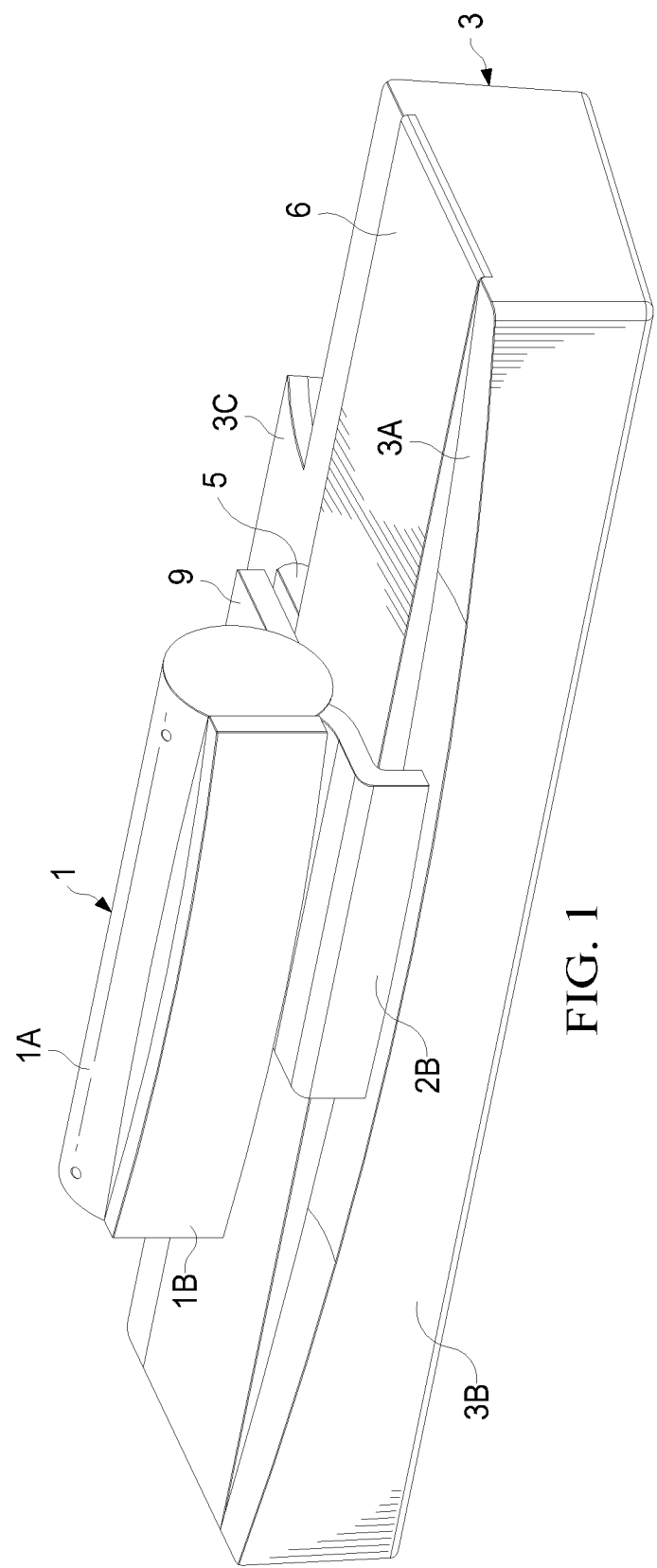
FIG. 1 is a perspective view of an embodiment of the inventive apparatus, including camera 1, camera mount 9, and hub 3.
Figure 9:
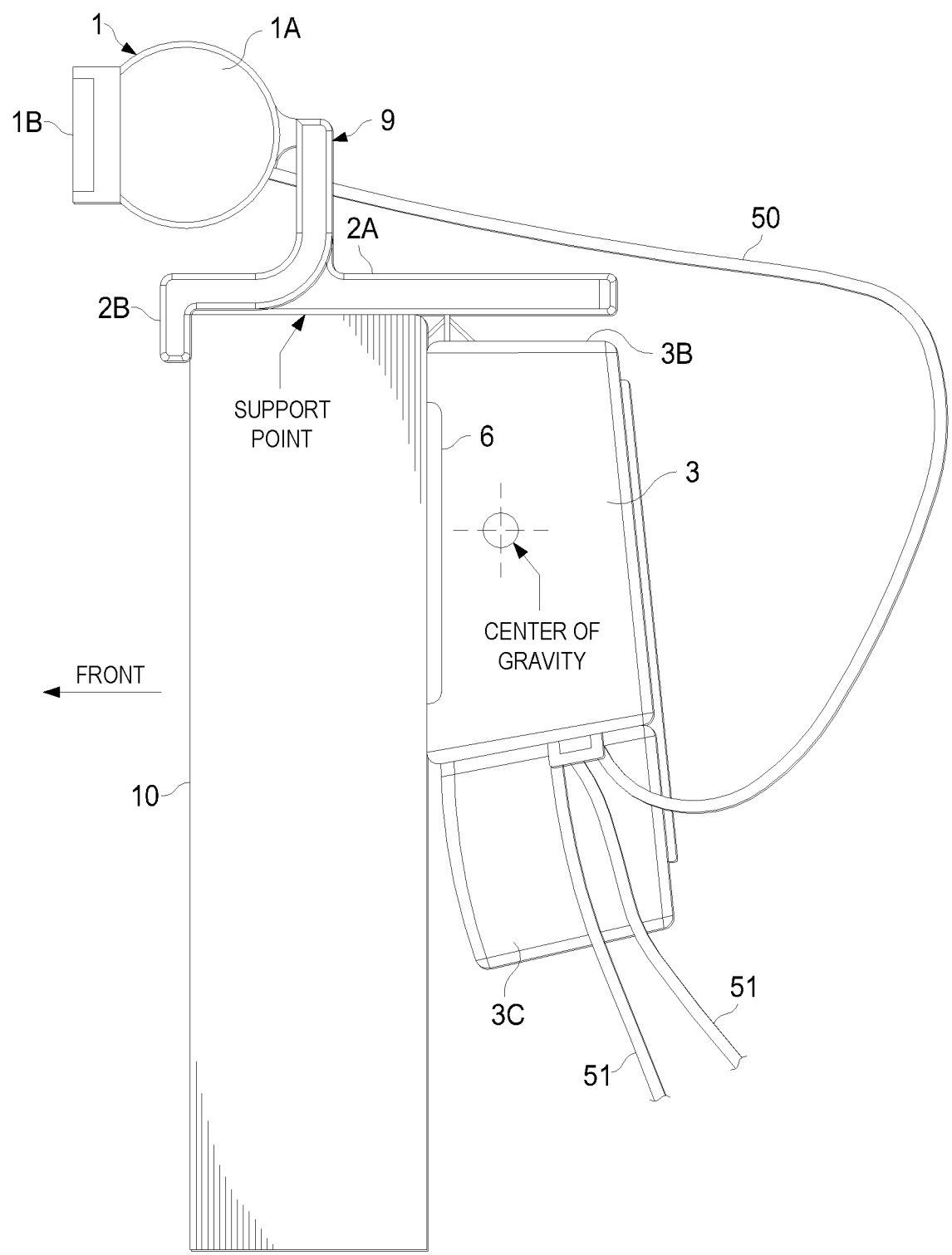
FIG. 9 is a side view of another configuration of the FIG. 1 apparatus, perched on monitor 10.

With reference to FIG. 1, one such embodiment includes video camera 1, video camera mount 9, and hub 3. Video camera 1 can mounted on mount 9, and mount 9 can be adjustably forward-mounted to hub 3 as shown in FIG. 1 (mount 9 can also be easily detached from hub 3 and then adjustably reverse-mounted to hub 3, e.g., as shown in FIG. 9).

Other embodiments of the inventive apparatus include: a video camera mount (e.g., mount 9 of FIG. 1 and FIGS. 3-9) configured to be adjustably attached, and easily detached from and reattached, to a hub (e.g., hub 3 of FIG. 1) in any of multiple configurations; such a video camera mount and a hub (e.g., mount 9 and hub 3 of FIG. 1); such a video camera mount (including a camera shell) and a hub (e.g., mount 9, shell 1A, and hub 3 of FIG. 1), and such a video camera mount including a camera shell attached thereto or integrally formed therewith (e.g., mount 9 of FIG. 1, with shell 1A attached thereto).

Video camera 1 includes camera shell 1A and camera subsystem 1B mounted to shell 1A. Mount 9 is configured to mount camera 1, and to be mountable (and to be easily detached from and reattached) to hub 3 in any of multiple configurations. In FIGS. 1 and 9, camera shell 1A is shown mechanically attached to mount 9. FIG. 1 shows one configuration in which mount 9 is attached to and supported by hub 3. FIG. 9 shows another configuration in which mount 9 is attached to hub 3 (and mount 9, camera 1, and hub 3 are perched on a monitor 10).

Figure 4:
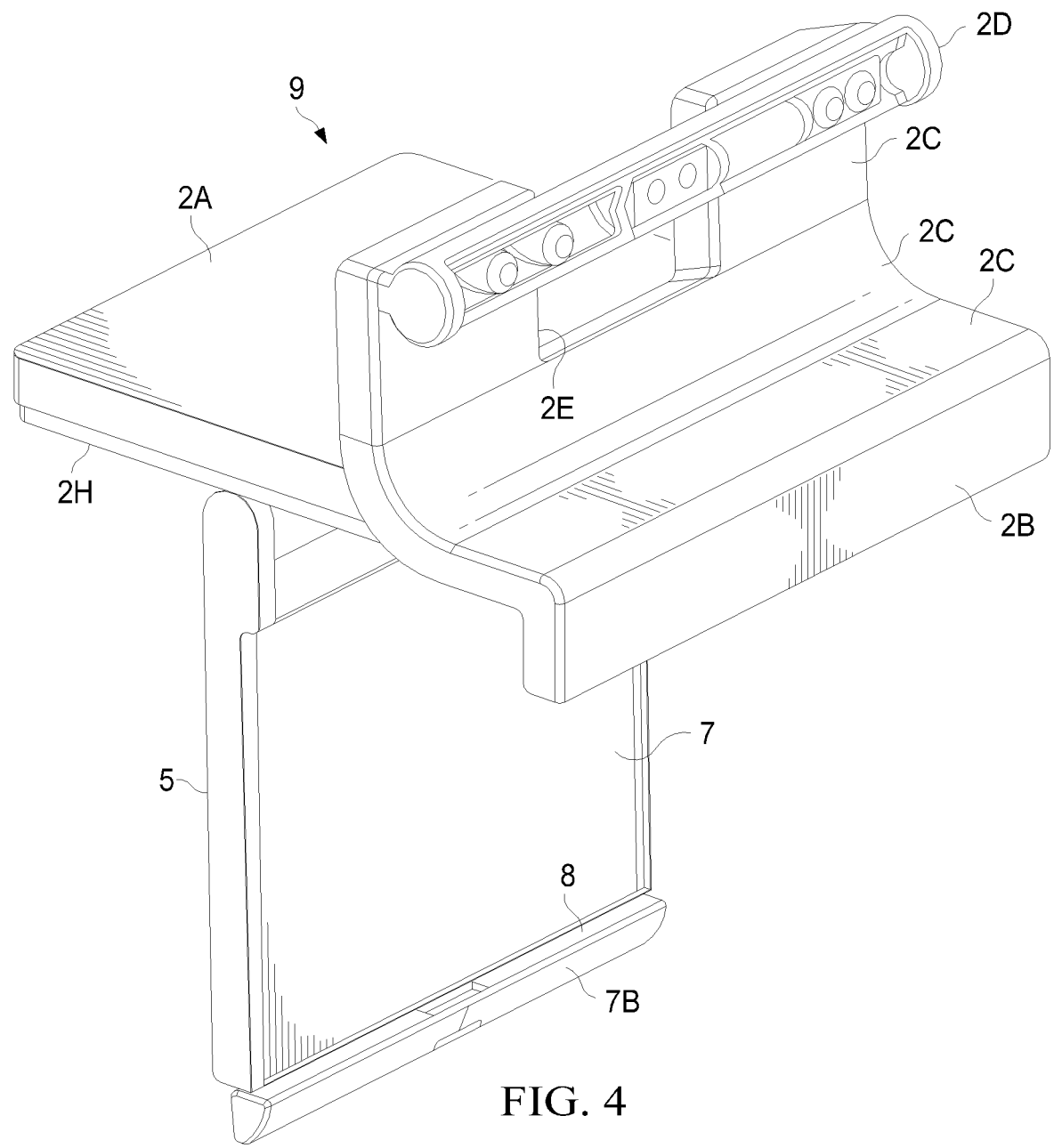
FIG. 4 is a perspective view of the camera mount of the FIG. 1 apparatus.

Subsystem 1B of camera 1 includes the camera optics (which may include a wide angle lens or other lens) and image capture elements. In typical use, camera 1 would be coupled by one or more cables (e.g., cable 50 shown in FIG. 9) to hub 3, to provide to hub 3 video data captured during a conference. In typical implementations, the cable(s) would be attached to subsystem 1B, passed around or through mount 9 (e.g., extended through the opening 2E defined by mount 9 as shown in FIG. 4), and attached to hub 3.

Hub 3 is a processor which is configured to perform video processing on the output of camera 1, and is optionally also configured to perform other processing (e.g., establishing a communication link with a remote conference server or other remote system or device). In an exemplary implementation, hub 3 is configured to operate in a mode in which it performs video processing on video (captured by camera 1 during a conference, and output from camera 1 to hub 3) having a first format (e.g., 4K format video) to generate output video having another format (e.g., in the mode, hub 3 generates 1080 p format video in response to 4K format video from camera 1).

In some embodiments, camera 1 is a 4K camera (which can output video in 4K format) and has a wide angle lens. In one example, the conferencing apparatus may use cabling which does not allow sufficiently high bit rates for sending 4K video. In this example, hub 3 may output (e.g., generate and output, or receive from camera 1 and then output) 1080 pixel video rather than 4K video captured by camera 1.

In some embodiments, hub 3, camera 1, and mount 9 are located in a first environment (e.g., a first endpoint of a video conference system), and hub 3 operates (during a video conference) to assert output video data (video data captured by video camera 1 or a processed version of such video data) over a communication link to a remote conference server. Typically, hub 3 is also coupled and configured to receive audio data (e.g., from a set of microphones, or a telephone including a set of microphones, in the first environment) captured (during the conference) in the first environment, and hub 3 operates (during the conference) to assert the audio data (or a processed version of such audio data) with the output video data over a communication link to the conference server. Alternatively, the conference server may otherwise receive audio data captured in the first environment during the conference.

Typically, the conference server also receives video and audio captured (during the same conference) at other endpoints of the video conference system. The conference server may process the video and audio from all the endpoints to generate a single conference video bitstream and a single conference audio bitstream (or a combined conference video and conference audio bitstream), and then transmit the conference video and conference audio to all or some of the endpoints. Hub 3 (at the first endpoint), or another apparatus at the first endpoint, may receive the conference video and conference audio (via a communication link) from the server and assert it to at least one monitor (at the first endpoint) for display by the monitor of the conference video and playback of the conference audio (the monitor may include or be coupled to loudspeakers or a headset for audio playback).

In embodiments in which hub 3 (at a first endpoint of a video conferencing system) is coupled to one or more microphones (not shown in FIG. 1) at the first endpoint, hub 3 may be configured to perform audio processing on audio data captured during a video conference by the microphone(s) and asserted to hub 3, and also to perform video processing on video data captured by camera 1 at the first endpoint during the conference. In such embodiments, hub 3 may be coupled and configured to assert a bitstream including output audio data (as well as output video data) over a communication link to a remote conference server, for use by the server to generate conference video and conference audio (e.g., a conference video and conference audio bitstream which is transmitted by the server to the hub and to other conference endpoints via the communication link).

Typically, cables (e.g., cables 50 and 51 of FIG. 9) of some or all of the following types are connected to (and extend out from) hub 3:

a power cable;

Ethernet cables (e.g., one for connecting hub 3 to a wide area network to assert output audio and output video to a remote conference server, and at least one other one for powering a set of microphones, a telephone, and/or other device in the first endpoint. Typically, the output video so asserted by hub 3 is compressed video generated by hub 3. The output audio may also be compressed, e.g., by hub 3, or by another system or device in the first endpoint);

USB cables (e.g., cable 51 implemented as a USB cable, for receiving input video from camera 1; another cable for receiving input video from an optionally included second camera; and a third cable coupled to a touchscreen controller or other device in the first endpoint);

HDMI output cables (e.g., two cables for driving up to two monitors with conference video received from a remote server);

at least one HDMI input cable (e.g., for screen sharing); and at least one cable for coupling to another device (e.g., a laptop computer which implements a different conference protocol, other than the conference protocol normally implemented by hub 3 and a remote conference server coupled by a communication link to hub 3).

In some embodiments, camera 1 may include microphones.

Although FIG. 9 shows two cables 51 connected to hub 3 (as well as cable 50 connected between camera 1 and hub 3), it is contemplated that more than (or less than) two cables 51 may be connected to (so as to extend out from) hub 3.

Figure 2:
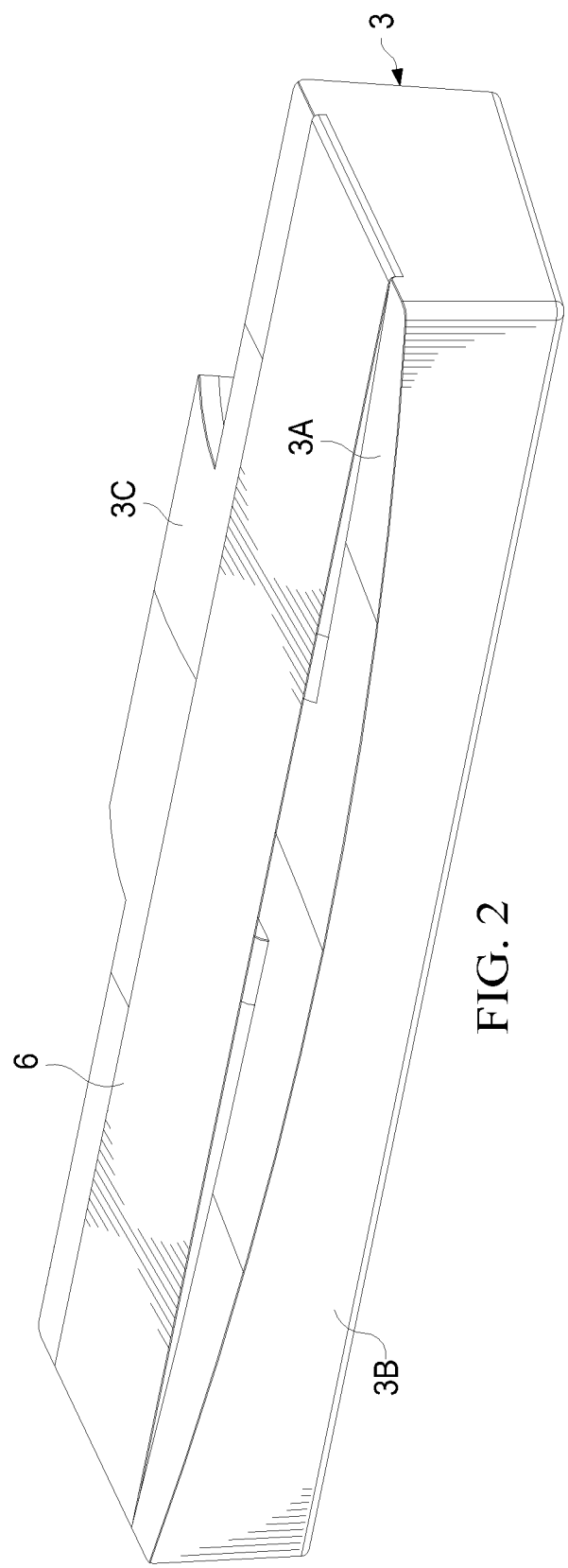
FIG. 2 is a perspective view of the hub of the FIG. 1 apparatus.

FIG. 2 is a perspective view of hub 3 alone, without camera 1 and mount 9.

Figure 3:
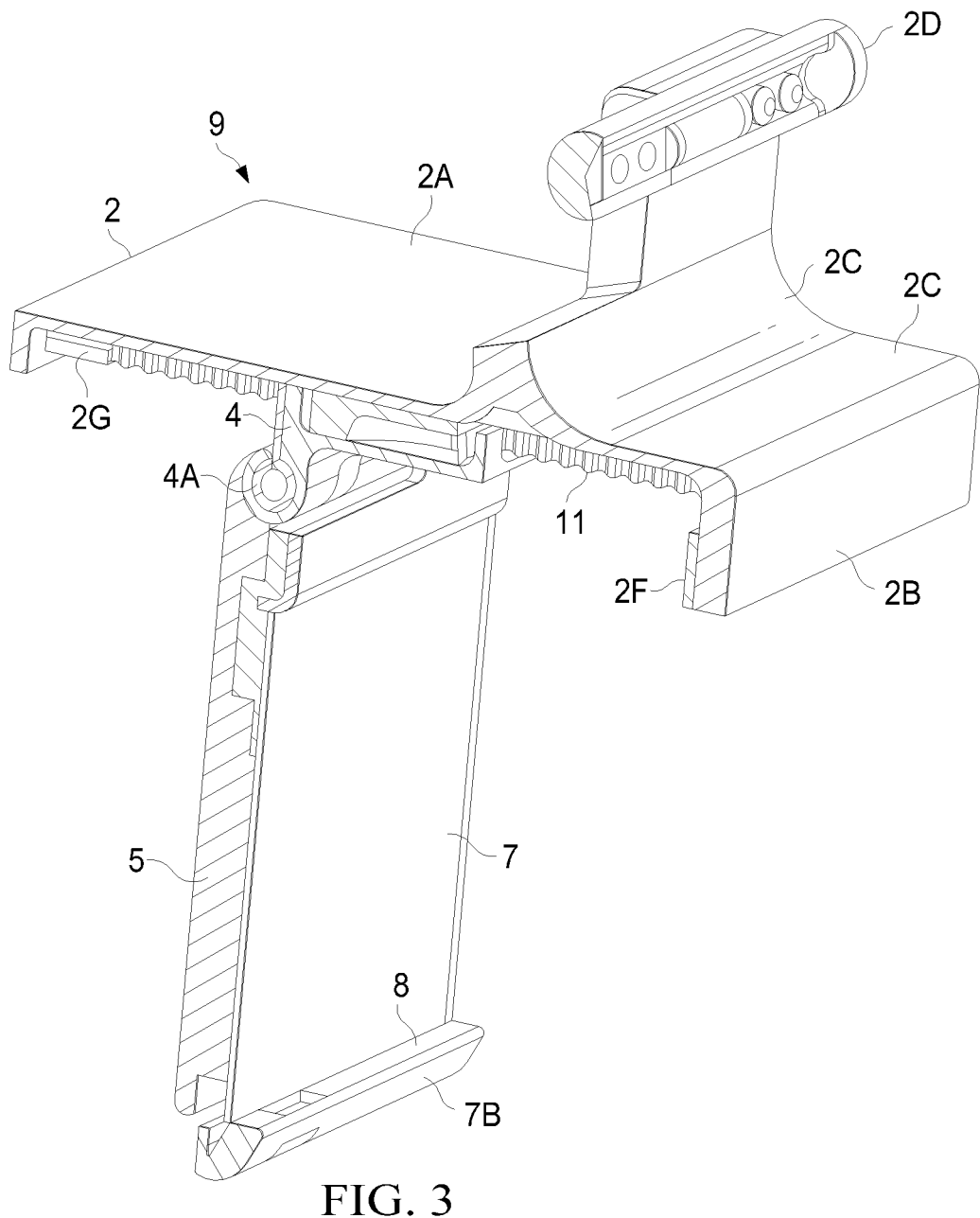
FIG. 3 is a cut-away view showing half of the camera mount of the FIG. 1 apparatus.

FIG. 4 is a perspective view of camera mount 9 alone. FIG. 3 is a cut-away view of half of camera mount 9, showing some details of mount 9's construction which are not visible in the FIG. 4 view. With reference to FIGS. 3 and 4, camera mount 9 includes first structure 2 (sometimes referred to herein as a "top" structure since it is at the top of mount 9 in FIGS. 3 and 4), slide element 4 (sometimes referred to as a "carriage" or "slide"), and foot 5. Top structure 2 comprises plate 2A, front retainer portion (retainer) 2B, camera supporting portion 2C, camera connecting structure 2D, and elements 2F, 2G and 2H. The elements of structure 2 are fixedly attached (or integrally formed) together in the positions shown in the Figures. To mount camera 1 to mount 9, camera shell 1A is aligned with structure 2 so as to be supported by portions 2C and 2D, and so that connection elements (e.g., for receiving bolts) of shell 1A are aligned with corresponding connection elements of structure 2D. Typically, bolts (or other connectors) are extended through the aligned connection elements of portion 2D and shell 1A to fasten shell 1A to structure 2, and camera subsystem 1B of camera 1 is mounted to shell 1A. Typically, at least one cable (e.g., cable 50 shown in FIG. 9) is coupled to subsystem 1B, and extended through opening 2E (shown in FIG. 4) defined by portion 2C (e.g., so that the free end of each cable can be coupled to hub 3).

Slide 4 of camera mount 9 includes tilt hinge 4A, and foot 5 is pivotably attached to slide 4 by hinge 4A. More specifically, a first end (the top end in FIG. 3) of foot 5 is pivotably attached to slide 4 by hinge 4A, and foot 5 has a retainer portion 7B (to be described below) at its other end (the bottom end in FIG. 3). Slide 4 (and thus the first end of foot 5 which is attached to slide 4) is translatable relative to structure 2 by elements (including detents of racks 11 of structure 2, and pawls 30 and 31 of slide 4) to be described below. Thus, slide 4 and structure 2 (attached to slide 4) have freedom to be pivoted (together as a unit) about hinge 4A relative to foot 5, and slide 4 and foot 5 (attached to slide 4) have freedom to be translated (together as a unit) relative to structure 2. Slide 4 (including hinge 4A) and foot 5 are configured so that when a user exerts force on the apparatus to pivot slide 4 and structure 2 (together as a unit) relative to foot 5 into a desired relative orientation, the apparatus will remain in this orientation until the user again exerts force on the apparatus to move elements 4 (and 2) into a different orientation relative to foot 5.

Foot 5 includes a latch catch element 7 which is spring-biased toward slide 4 of mount 9 (when foot 5 is assembled with slide 4 as shown). Element 7 is supported by the rest of foot 5 (the portion of foot 5, to be referred to herein as a support structure, other than element 7) such that element 7 has freedom to be displaced (translated) away from slide 4 (by pulling element 7 so as to overcome the spring-biasing force which urges element 7 toward slide 4) relative to the rest of foot 5, and is configured to relax back toward slide 4 (relative to the rest of foot 5) when no force sufficient to overcome the spring biasing force is exerted thereon. Retainer portion 7B is an end portion of element 7 which defines a catch surface 8. Surface 8 is shaped to engage an object (e.g., bar 6 of hub 3) to allow spring-biased element 7 to urge the object toward slide 4 and structure 2 (e.g., so that the object can be held between structure 2 (and/or slide 4) and surface 8 by the spring biasing force exerted on the object by surface 8). Portion 7B (and thus all of element 7) may be pulled (e.g., by a user) away from slide 4 (and structure 2) relative to the rest of foot 5, by overcoming the spring biasing force on retainer portion 7B (e.g., to release an object being held between structure 2 (and/or slide 4) and surface 8).

All elements of mount 9 are typically made of metal, except for plastic friction inserts (left insert 20, right insert 21, and middle insert 22 of slide 4) mounted to the main metal part of slide 4 (to provide a plastic-to-metal interface at which slide 4 can translate relative to structure 2), and plastic pawls (pawls 30 and 31 of slide 4) mounted to the main metal part of slide 4, and optionally also plastic or rubber pad 2F (mounted to portion 2B of structure 2) and/or retainer pads (e.g., made of plastic or other material) mounted to cover screws (or other connectors) which may be included to connect elements of 9 to each other. Typically, parts of camera mount are attached together by screws, some (or all) of which are then hidden under rubber or plastic retainer pads.

With reference to FIGS. 3-8, elements of the exemplary embodiment which allow foot 5 to pivot (relative to the rest of mount 9) and slide 4 (together with foot 5 attached thereto) to translate forward or backward (relative to structure 2 of mount 9) are described.

Structure 2 includes plate 2G (best shown in FIG. 7, and also in FIGS. 3 and 5) and plates 2H. Plate 2G defines two parallel rails 12 and two racks 11 which are parallel to rails 12. Each rack 11 comprises detents (e.g., the detent having surfaces 11A and 11B shown in FIG. 8). The detents of one rack 11 are dimensioned and positioned to engage catch 34 of pawl 30 (of slide 4) and the detents of the other rack 11 are dimensioned and positioned to engage catch 34 of pawl 31. Plate 2G is positioned below top plate 2A and is retained against plate 2A by plates 2H (one plate is visible in each of FIGS. 3, 4, and 5).

Slide 4 includes left pawl 30, right pawl 31, springs 32 and 33, left friction insert 20, right friction insert 21, and middle friction insert 22. Pawl 30 is pivotably mounted to slide 4 (e.g., to the main portion of slide 4, which is the portion of slide 4 other than pawls 30 and 31 and springs 32 and 33) and is spring biased (by spring 32) against the detents of one rack 11. Pawl 31 is pivotably mounted to slide 4 (e.g., to the main portion of slide 4) and spring biased (by spring 33) against the detents of the other rack 11. Friction insert 20 has a groove in its outer surface for receiving one of rails 12, so that insert 20 engages and slides along the rail when slide 4 is translated relative to plate 2G (and the rest of structure 2). Friction insert 21 has a groove in its outer surface for receiving the other one of rails 12, so that insert 21 engages and slides along the rail when slide 4 is translated relative to plate 2G (and the rest of structure 2). The outer surfaces of insert 22 engage and slide along the parallel smooth inner surfaces 11C of racks 11 when slide 4 is translated relative to plate 2G (and the rest of structure 2).

Figure 7:
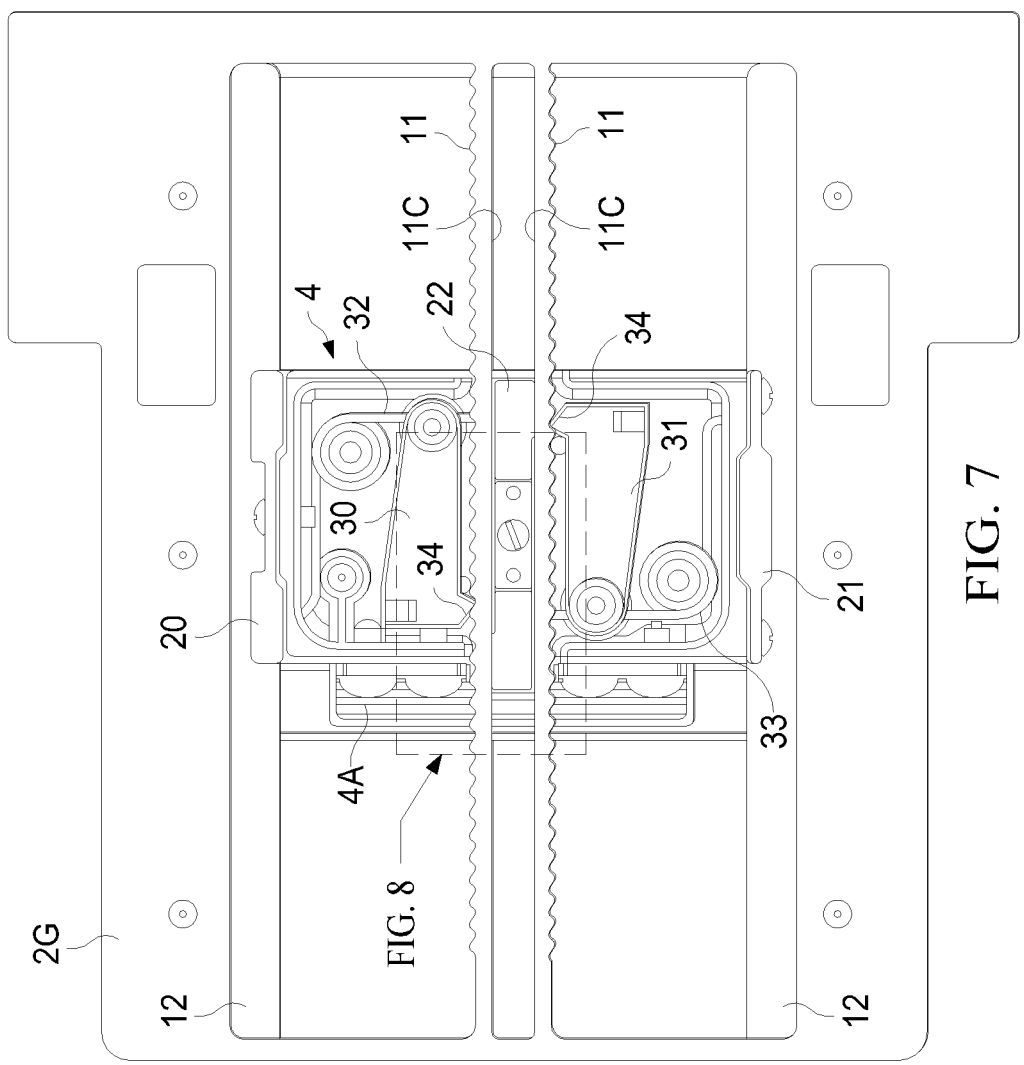
FIG. 7 is an elevational view of elements of the camera mount of FIG.

Pawls 30 and 31 are preferably identical (to reduce manufacturing costs) but are mounted to slide 4 in opposite orientations (so catch 34 of pawl 30 is on the left end of pawl 30 and catch 34 of pawl 31 is on the right end of pawl 31 when viewed as in FIG. 7). Spring 32 is mounted to the slide 4 so as to spring bias the pawl 30 (in a counterclockwise direction when viewed as in FIG. 7) against one rack 11 (with catch 34 engaged with detents of this rack). Spring 33 is mounted to the slide 4 so as to spring bias the pawl 31 (in a counterclockwise direction when viewed as in FIG. 7) against the other rack 11 (with catch 34 engaged with detents of this rack). Thus, acting together, pawls 30 and 31 are spring biased to exert a net torque on the racks 11 of plate 2G (and thus on structure 2). This torque prevents plate 2G (and the rest of structure 2) from undesirably moving (e.g., vibrating or rattling) relative to slide 4 during use of the apparatus.

In a typical implementation, pawls 30 and 31 are biased as follows by springs 32 and 33. The end of pawl 30 which is pivotably mounted to the main portion of slide 4 has a hole extending therethrough for receiving a first end of spring 32, and the other end of spring 32 is fixedly attached to the main portion of slide 4 (so that the first end of coiled spring 32 exerts torque on pawl 30 which urges its catch 34 against one rack 11) Similarly, the end of pawl 31 which is pivotably mounted to the main portion of slide 4 has a hole therethrough for receiving a first end of spring 33, and the other end of spring 33 is fixedly attached to the main portion of slide 4 (so that the first end of coiled spring 33 exerts torque on pawl 31 which urges its catch 34 against the other rack 11).

Slide 4 (including pawls 30 and 31 and springs 32 and 33) and plate 2G (including racks 11) are configured so that when a user exerts force on the apparatus to translate slide 4 (toward the left or the right of FIG. 7) relative to plate 2G (and thus relative to the rest of structure 2) into a desired relative position, the apparatus will remain in this position (due to force exerted by pawls 30 and 31 on plate 2G) until the user again exerts force on the apparatus to translate element 2G (and thus the rest of structure 2) into a different position relative to slide 4 (and foot 5 attached to slide 4).

Preferably, each of the detents of each rack 11 has an asymmetrical shape (and catch 34 of each pawl has a corresponding shape), such that slide 4 biases pawls 30 and 31 against the racks 11 asymmetrically, in the sense that:

it is relatively easier (relatively low user force on the apparatus needs to be exerted) to translate slide 4 in a closing direction (toward the left in FIG. 7 and FIG. 8) which closes the camera mount 9 by moving foot 5 toward retainer 2B of structure 2 (e.g., to tighten elements 2B and 5 against a monitor); and it is relatively more difficult (relatively more user force must be exerted on the apparatus) to slide in the opposite direction (an "opening" direction which is toward the right in FIG. 7 and FIG. 8) to open the camera mount 9 by moving foot 5 away from retainer 2B of structure 2 (e.g., to move elements 2B and 5 away from each other to release a monitor which had been gripped between elements 2B and 5).

Figure 8:
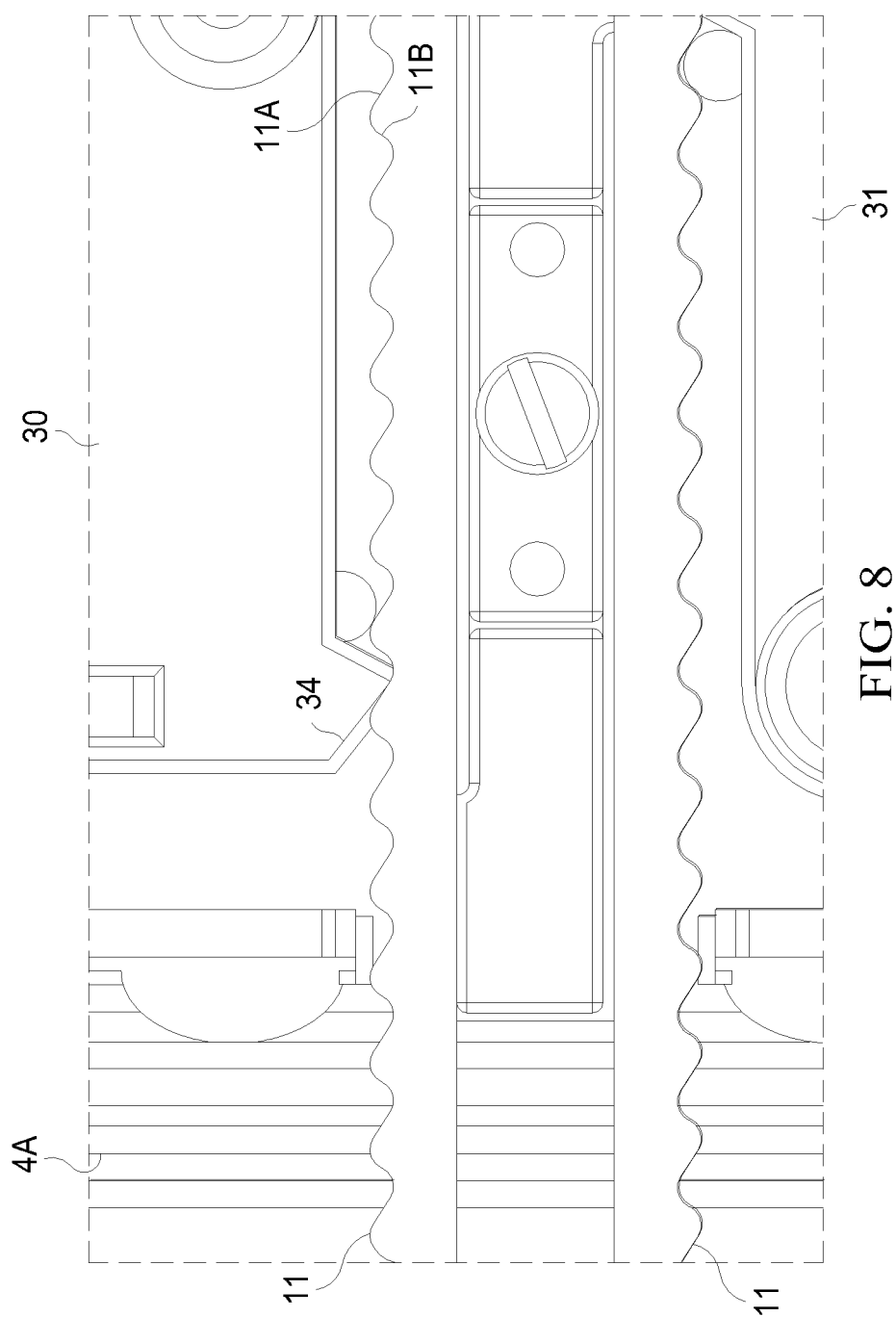
FIG. 8 is an enlarged view of a portion of the FIG. 7 apparatus.

To achieve this asymmetric biasing force, each detent preferably has an asymmetrical, generally triangular shape (e.g., as shown in FIG. 8), with one surface 11A (the left surface of each detent of the upper rack 11, viewed as in FIGS. 7 and 8) of the detent oriented at a relatively greater angle outward from the longitudinal axis of the rack (oriented horizontally in FIGS. 7 and 8) than the other surface 11B (the right surface of each detent of the upper rack 11, viewed as in FIGS. 7 and 8) of the detent. In such preferred embodiments, each catch 34 has a shape corresponding to that of the detents of the rack which it engages. Specifically, as shown in FIG. 8, each catch 34 preferably has an asymmetrical, generally triangular shape, so that in use of the apparatus, one surface of the catch (the left surface of catch 34 of pawl 30, as viewed in FIGS. 7 and 8) is oriented generally parallel to one protruding surface of each asymmetric detent (surface 11B in FIG. 8), and the other surface of the catch (the right surface of catch 34 of pawl 30, as viewed in FIGS. 7 and 8) is oriented generally parallel to the other protruding surface of the asymmetric detent (surface 11A in FIG. 8).

Elements 4 and 2G (including pawls 30 and 31, inserts 20, 21, and 22, and racks 11) of mount 9 implement a detent-friction slide, which is useful to adjust the mount for use with (e.g., use when perched, with a video camera and a hub, on) monitors of different thicknesses. In typical implementations (including those described herein), the friction slide is reliable, and immune to inadvertently being left unlocked.

We next describe mechanical aspects of hub 3 with reference again to FIG. 2, which shows hub 3 alone (without camera 1 and mount 9), and FIGS. 1 and 9. In the embodiment shown, hub 3 has a bar 6 (typically made of metal) extending from its right side to its left side. Hub 3 also has a front surface 3B and a surface 3A. Surface 3A will be referred to as the "top surface" of hub 3 since it is the top surface when hub 3 is oriented as in FIGS. 1 and 2. Typically, hub 3 is implemented to have a rear tail portion 3C which is laterally narrower than the rest of hub 3. The rear surface of the hub (the surface opposite the front surface 3B, to which cabling is typically connected) includes the exposed surface of tail portion 3C. Top surface 3A is shaped (e.g., has a concave shape as shown in FIGS. 1 and 2) and positioned relative to bar 6, to define a gap (a clearance space) between surface 3A and bar 6, to allow mounting of the camera mount 9 to hub 3, with foot 5 of mount 9 extending through the gap. The gap is shaped and sized to receive foot 5 of camera mount 9, so that camera mount 9 can be mechanically coupled to hub 3 (by sliding foot 5 through the gap between bar 6 and hub surface 3A).

Alternatively, the hub of the inventive apparatus (e.g., a variation on hub 3) has a mount element other than bar 6 (e.g., a bar or other member which is shaped differently than bar 6, and which may but need not extend from one side of the hub to an opposite side of the hub). In typical embodiments, the hub has a top surface, a front surface, and a rear surface. The top surface (which may be a concave top surface) and the mount element are shaped and positioned relative to each other to define a gap (a clearance space) between said top surface and said mount element. Of course, the hub can typically be oriented in many different ways during use, so that the "top" surface need not be oriented during use in any particular way relative to the earth's gravitational field. The gap should be sized and shaped to allow mounting of an embodiment of the inventive camera mount to the hub, with an element (e.g., a foot) of the camera mount extending through the gap. In some embodiments, the gap allows mounting of an embodiment of the inventive camera mount to the hub, with a foot of the camera mount extending through the gap and a latch catch element of the foot lockable against (and unlockable and removable from) the mount element.

Figure 5:
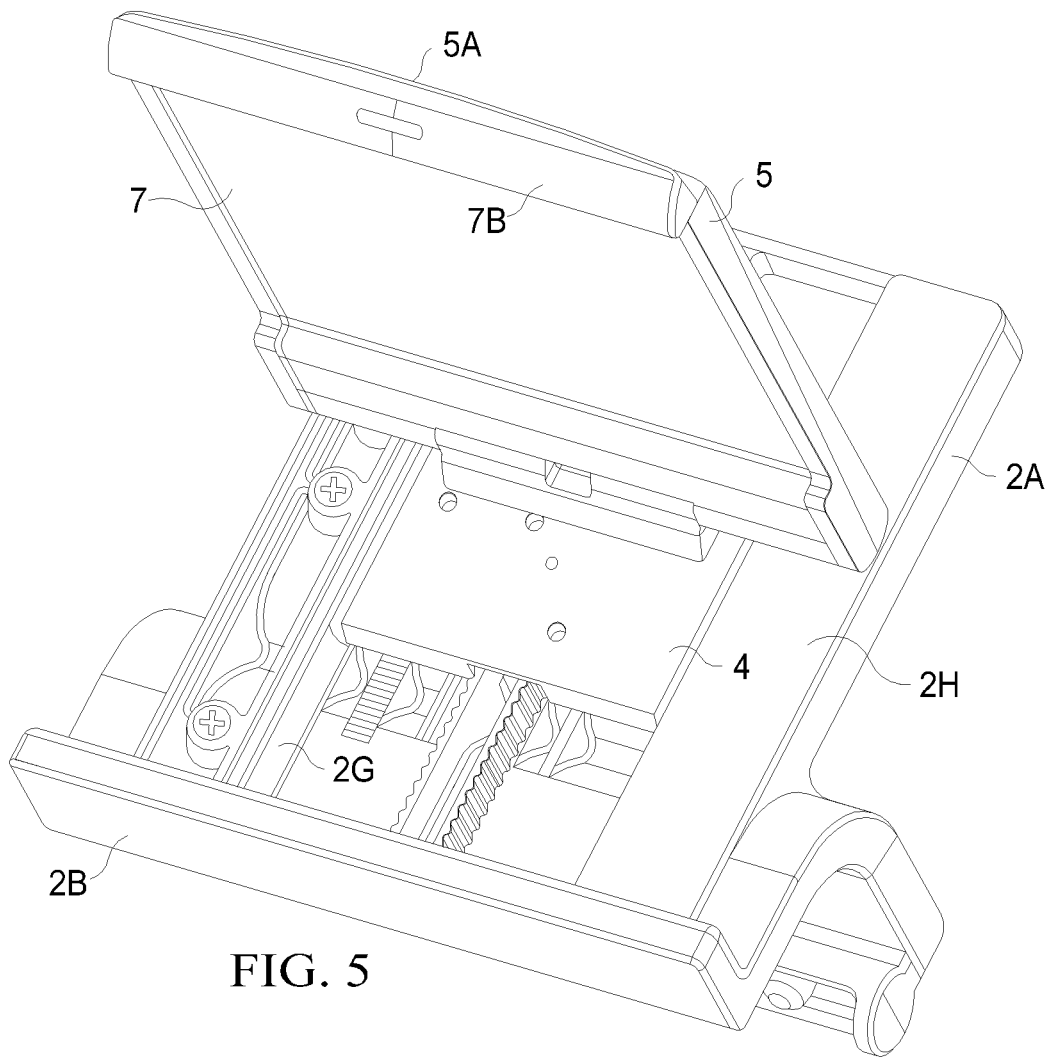
FIG. 5 is another perspective view of the camera mount of the FIG. 1 apparatus.
Figure 6:
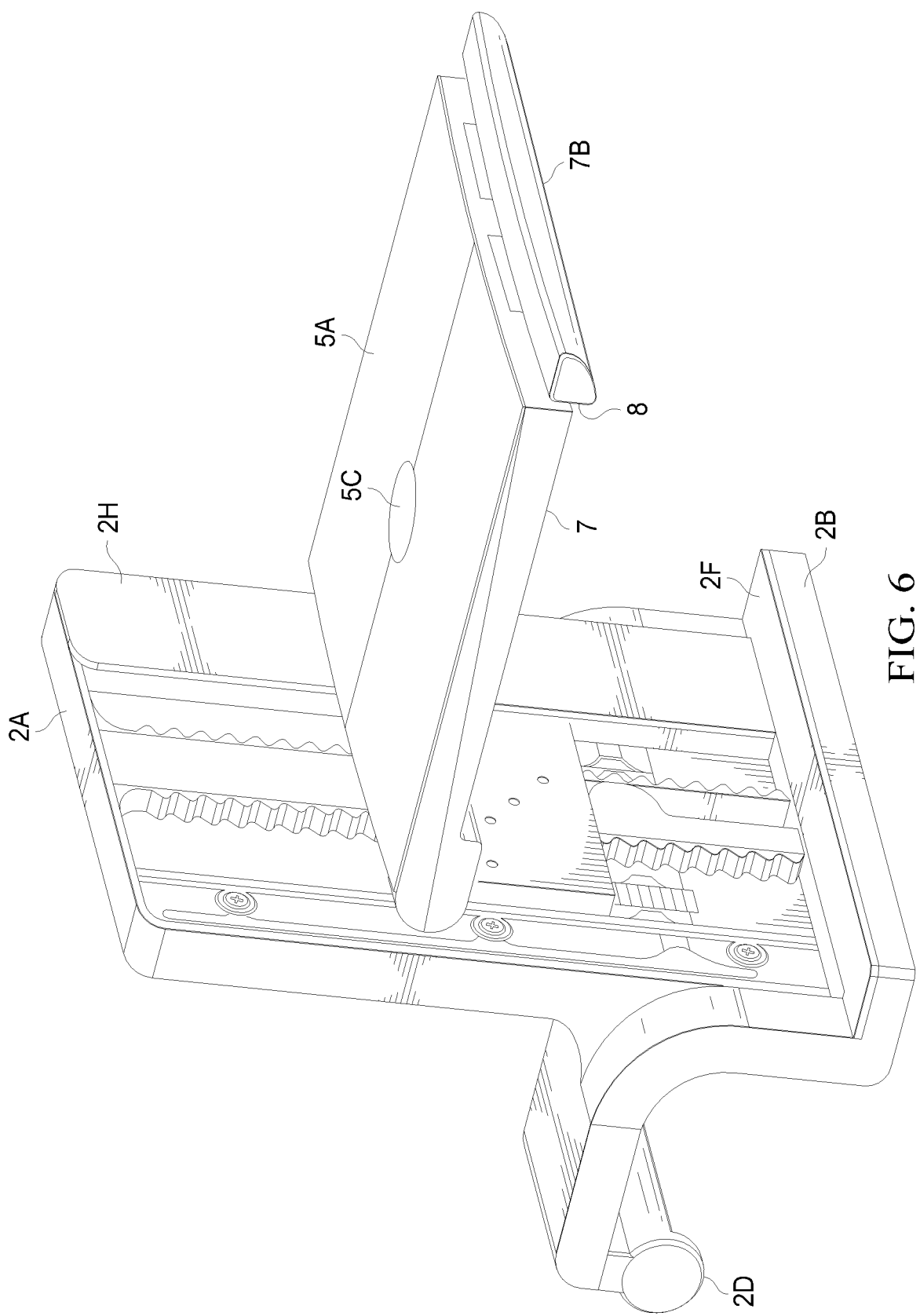
FIG. 6 is another perspective view of the camera mount of the FIG. 1 apparatus.

With reference to the FIG. 2 embodiment, bar 6 is typically a flat (or generally flat) plate, and foot 5 has a flat (or generally flat) surface which can be advanced under or against bar 6 in the gap between bar 6 and top surface 3A of hub 3. Also typically, top surface 3A has concave curvature (as shown in FIGS. 1 and 2) and foot 5 has a matching convex curved surface (e.g., convex surface 5A of foot 5, as shown in FIGS. 5 and 6). Optionally, foot 5 defines a hole (e.g., hole 5C shown only in FIG. 6) which extends through it, so that a cable can be passed through foot 5 (e.g., from a monitor on which mount 9 is perched, e.g., in a separated mode in which hub 3 is not mechanically supported by mount 9).

To enter one mounting configuration (for mounting hub 3 to mount 9 as shown in FIG. 9), foot 5 of mount 9 can be advanced (downward, if hub 3 is oriented as in FIG. 9) through the gap between bar 6 and hub surface 3A until surface 8 of spring-biased retainer portion 7B of foot 5 is engaged with the farthest (lowest) surface of bar 6 (the surface of bar 6 nearest to tail 3C), and spring biasing force exerted (upward) by surface 8 on bar 6 causes hub 3 to be held against (locked to) slide element 4 (and/or structure 2) of mount 9. More specifically, surface 8 of portion 7B of spring-biased element 7 of foot 5 (as shown in FIG. 4) is shaped to engage bar 6 of hub 3, to allow spring-biased element 7 to urge bar 6 (and thus all of hub 3) toward slide 4 and structure 2 of mount 9 (e.g., so that bar 6 can be held between structure 2 (and/or element 4) and surface 8 by the spring biasing force exerted on bar 6 by surface 8 of element 7 of foot 5). To release hub 3 from mount 9 (when it is being so held between structure 2 (and/or element 4) and surface 8 of mount 9), portion 7B (and thus all of element 7) may be pulled (e.g., by a user) away from slide 4 (and structure 2) relative to the rest of foot 5, by overcoming the spring biasing force on retainer portion 7B.

In the mounting configuration ("perch mode") shown in FIG. 9, mount 9 is in a configuration (e.g., as shown in FIGS. 3 and 4) with foot 5 perpendicular (or substantially perpendicular) to plate 2A of mount 9, and spring-biased retainer portion 7B of foot 5 is engaged with the lower surface of bar 6 (in the orientation shown in FIG. 9) to support hub 3 (with the upward spring biasing force exerted by retainer 7B on bar 6 preventing hub 3 from falling downward). In this configuration, elements 1, 9, and 3 may be stably perched on a monitor (e.g., the upper surface of monitor 10 as shown in FIG. 9, labeled "support point" in FIG. 9), with retainer portion 2B of mount 9 engaged with a front surface of the monitor (e.g., the front surface of monitor 10 as shown in FIG. 9), and hub 3 engaged with the monitor's back surface (e.g., the back surface of monitor 10 as shown in FIG. 9). Thus, the assembly comprising mount 9 (and camera 1 attached thereto) and hub 3 is stably perched on the monitor. Slide 4 is positioned (along racks 11) sufficiently far away from retainer portion 2B that monitor 10 can fit between portion 2B and hub 3. Foot 5 (and thus hub 3) is pivoted to be in a first angular orientation relative to plate 2A of camera mount 9 (with front surface 3B of hub 3 parallel or substantially parallel, and foot 5 perpendicular or substantially perpendicular, to plate 2A) Typically, the inventive apparatus is implemented so that the relative weights of its hub and camera mount (e.g., hub 3 and camera mount 9 of FIG. 9), and the video camera mounted during in use of the apparatus to the camera mount (e.g., camera 1 of FIG. 9), are such that in the perch mode (e.g., shown in FIG. 9) in which the inventive apparatus (with camera) is perched on a support point of a monitor (e.g., the portion of monitor 10 of FIG. 9 labeled "support point"), the center of gravity of the inventive apparatus (with camera) is below (preferably, substantially below, as indicated in FIG. 9) the support point of the monitor. Such a low center of gravity improves the stability with which the inventive apparatus (and camera) are mounted on the monitor.

In the mounting configuration ("perch mode") shown in FIG. 9, camera 1 is "reverse-mounted" (to hub 3) in the sense that foot 5 has been inserted under bar 6 of hub 3 from the front surface of bar 6 (the surface nearest to front surface 3B of the hub) toward tail 3C of the hub. Thus, hinge 4A of slide 4 is at the front of the hub (near to front surface 3B and far from tail 3C). This allows all cabling (e.g., cables 50 and 51 shown in FIG. 9) to be hidden behind the front of monitor 10, the front of camera 1, and mount 9. However, with camera 1 so "reverse-mounted" to hub 3, if elements 1, 3, and 9 were removed from their perch on monitor 10, and foot 5 (and thus hub 3) were pivoted (clockwise when viewed from the viewpoint of FIG. 9) about hinge 4A to become generally parallel to top plate 2A of mount 9 (and elements 1, 9, and 3 were then placed on a horizontal surface with the mount 9 and camera 1 resting on hub 3), the cabling (e.g., cables 50 and 51) extending out from the back of hub 3 would be (undesirably) be visible to a person viewing the front of camera 1. For this reason, it is preferable that camera 1 be "forward-mounted" to hub 3 (in the manner to be explained below with reference to FIG. 1) in a tabletop mode (to be explained below) in which mount 9 and camera 1 rest on hub 3.

In another mounting configuration (a "tabletop mode" as shown in FIG. 1) of typical embodiments of the inventive apparatus (e.g., the embodiment of FIGS. 1-9), the camera mount (mount 9) is in a configuration with its foot (e.g., foot 5) parallel (or generally parallel) to the top plate of the camera mount (plate 2A of mount 9), and the foot (5) extends through the gap between the bar (6) and top surface (3A) of the hub (3), so that the camera mount (9) and the camera (1) attached to the camera mount (9), are stably supported mechanically by the hub (e.g., by the hub's bar (6) or the bar (6) and tail portion (3C) of the hub). In such configuration of the embodiment of FIGS. 1-9, retainer portion 2B of mount 9 is preferably engaged with the front surface of bar 6, so that mount 9 (except for the portion thereof under bar 6), and camera 1 attached to mount 9, stably rest on bar 6 and tail portion 3C (with the engagement of portion 2B of mount 9 with bar 6 enhancing the stability of the resting configuration). Thus, in the tabletop mode, the camera mount (and typically also a camera mounted on the camera mount) are mechanically supported by the hub.

In the mounting configuration ("tabletop mode") shown in FIG. 1, slide 4 of mount 9 is positioned (along racks 11) relatively close (e.g., as close as possible) to portion 2B of mount 9, so that mount 9 can fit on (and be stably supported by) hub 3. Foot 5 (and thus hub 3 engaged therewith) is pivoted to be in an angular orientation relative to plate 2A of camera mount 9 (different from that shown in FIGS. 3 and 4), with front surface 3B of hub 3 perpendicular or approximately perpendicular, and foot parallel or approximately parallel, to plate 2A.

In the tabletop mode, camera 1 is "forward-mounted" to hub 3 in the sense that that foot 5 has been inserted under bar 6 of hub 3 from the rear surface of bar 6 (the surface nearest to tail 3C of the hub) toward front surface 3B of the hub. Thus, hinge 4A of slide 4 is at the rear of the hub (relatively far from front surface 3B and nearer to tail 3C). This allows all cabling (e.g., cables 50 and 51 of FIG. 9) connected to camera 1 and hub 3 to be hidden behind camera 1, mount 9, and hub 3 (when camera 1 and hub 3 are viewed by a user facing the front of camera 1, e.g., during a conference). Typically, the same viewer would also be facing the front of a monitor (positioned separately from camera 1 and hub 3) during the conference.

In a third mounting configuration (a "separated mode"), the video camera (e.g., camera 1) is neither mechanically mounted to nor otherwise mechanically supported by the hub (e.g., hub 3). The camera with the camera mount (e.g., mount 9) can be perched atop a monitor, and the hub can sit (separately from the monitor) on a table or other surface. In the separated mode, the hub (e.g., hub 3) may be coupled to the camera (e.g., camera 1) by cable(s), e.g., cable 50 of FIG. 9, e.g., for data and/or electrical signal and/or electric power between the camera and hub. However, neither the cable(s) nor the camera mount nor the camera would mechanically support the hub in this mode. To enter the separated mode, with the apparatus already in the "perch mode" configuration shown in FIG. 9 (with monitor 10 resting on a table or other surface), hub 3 can be easily detached from mount 9 (by manipulating element 7B of foot 5 to unlock the hub from mount 9, and then removing the hub) and hub 3 can then be moved (e.g., to rest directly on the table or other surface), thereby leaving the apparatus in the separated mode (with camera 1 and mount 9 perched on monitor 10, and hub 3 mechanically separated from camera 1 and mount 9, though hub 3 may be coupled by cable(s) to camera 1).

Figure 12:
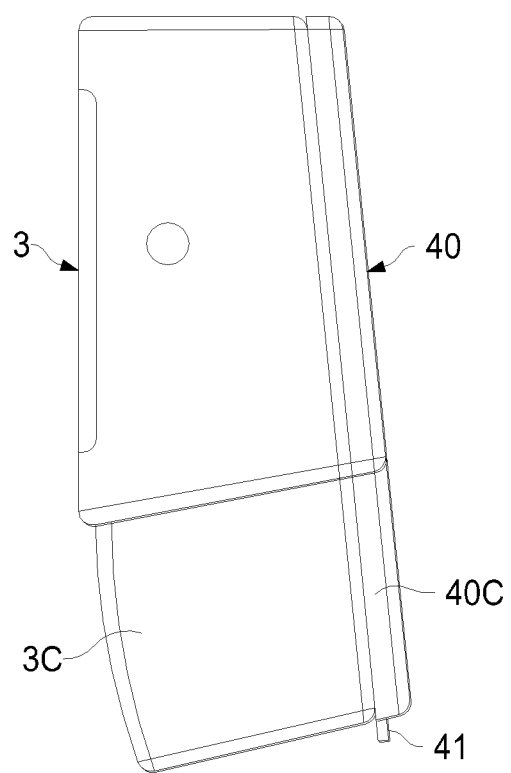
FIG. 12 is a simplified side view of the wall plate of FIGS. 10 and 11, mounted to hub 3 of FIG. 1.

Optionally, the inventive apparatus includes not only a hub (e.g., hub 3) but also a wall mounting plate configured to mate with (and attach to) the hub so that the plate (and thus the hub attached thereto) can be mounted to a wall or other surface. An example of such a wall mounting plate is plate 40 of FIGS. 10, 11, and 12. Plate 40 has a spring-biased catch 41, and protruding keys 42 which protrude out from the face of plate 40 (the large face shown in FIG. 10) to which the hub is to be attached. To attach plate 40 to the hub, keys 42 can slide into key hole slots in the bottom surface (the surface opposite to top surface 3A) of the hub, and catch 41 can then be allowed to relax into its spring-biased position against the hub to lock the hub to plate 40. FIG. 12 shows plate 40 so mounted and locked to hub 3 (to the bottom surface of hub 3), with relatively narrow tail portion 40C of plate 40 aligned with matching tail portion 3C of hub 3. To release the hub from plate 40, a user can displace catch 41 from its locked position (by overcoming the spring biasing force which urges catch 41 into the locked position) and then decouple the hub from plate 40. Alternatively, plate 40 can be mounted to hub 3 by extending bolts or screws (or other connectors) through holes in plate 40 into matching holes in the hub. Preferably, such holes (of both plate 40 and hub 3) comply with the VESA mounting standard for monitors. Holes extending through plate 40 (e.g., holes 40A) can be used to mount plate 40 to a wall or other surface (e.g., to a bracket attached to the wall or other surface), by extending bolts or screws (or other connectors) through the holes. Preferably, such holes (through plate 40) comply with the VESA mounting standard for monitors.

For use in an environment (e.g., a huddle room) having at least one glass (or otherwise smooth) wall or other smooth surface, it may be desirable to mount the inventive wall plate (before or after it is mechanically attached to the hub) to the smooth wall (or other surface) with an adhesive, rather than to bolt (or otherwise attach) it with VESA-compliant connectors.

In use, camera 1 can be mechanically connected (by mount 9) to hub (processing unit) 3, with hub 3 having freedom to be repositioned (e.g., pivoted about hinge 4A of mount 9 and/or translated relative to racks 11 of mount 9) relative to camera 1, and with hub 3 being easily separable from mount 9 (and then reattached, e.g., in a different configuration, to mount 9). A class of embodiments of the inventive apparatus has (and can be used in any of) multiple mounting configurations, any of which can be selected by the user. For example, with reference to the embodiment discussed above with reference to FIGS. 1-12), the mounting configurations include:

a tabletop mode: in this mode, the video camera (e.g., camera 1) is forward-mounted by the camera mount (e.g., mount 9) to the hub (e.g., hub 3), so that the camera, mount, and hub can sit on a table (or other surface). FIG. 1 shows camera 1, mount 9, and hub 3 connected in the tabletop mode;

a perch mode: in this mode, the video camera (e.g., camera 1) is reverse-mounted by the camera mount (e.g., mount 9) on the hub (e.g., hub 3), so that the camera, mount, and hub can be perched atop a monitor. FIG. 9 shows camera 1, mount 9, and hub 3 connected in the perch mode, and perched on monitor 10;

a separated mode: in this mode, the video camera (e.g., camera 1) is not mounted to the hub (e.g., hub 3). However, the camera, and the camera mount (e.g., mount 9) to which it is mounted, can be perched atop a monitor, and the hub can sit (separately from the monitor) on a table or other surface. In the separated mode, the hub (e.g., hub 3) would typically be coupled to the camera (e.g., camera 1) only by cable(s), and would not be mechanically supported by the cable(s), or the camera, or the camera mount. Such cable(s), e.g., cable 50 shown in FIG. 9, would typically be present during use of the apparatus. For example, starting in the "perch mode" configuration shown in FIG. 9 (with monitor 10 resting on a table), hub 3 can be detached from mount 9 and moved (to rest on the table), thereby leaving the apparatus in the separated mode (with camera 1 and mount 9 perched on monitor 10, and hub 3 coupled only by cable(s) to camera 1); and a wall mount mode: in this mode, the hub (e.g., hub 3) is mounted to a wall plate (e.g., wall plate 40), and the wall plate can be attached (e.g., bolted or adhered) to a wall (or other surface). For example, FIG. 12 shows hub 3 and plate 40 in the wall mount mode, with hub 3 mounted to plate 40. In wall mount mode (e.g., as shown in FIG. 12), camera 1 can be attached (by mount 9) to hub 3, and plate 40 can be attached to a wall or other surface. Thus, camera 1 can be mounted, via mount 9, hub 3 and plate 40, to the wall (or other surface). Alternatively, in the wall mount mode, the video camera (e.g., camera 1) can be mechanically separated from the hub (e.g., hub 3). For example, camera 1 can be mechanically separated from hub 3 (in the wall mount mode shown in FIG. 12) and camera 1 can instead be perched (with mount 9) atop a monitor.

As noted above, in the perch mode with hub 3 attached (by mount 9) to camera 1, the center of gravity of the combined assembly (camera 1, mount 9, and hub 3) is below the support point, resulting in superior stability. As also noted above, in the perch mode, with hub 3 attached (by mount 9) to camera 1, e.g., as shown in FIG. 9, hub 3 (and any cable connected thereto) is unobtrusive (hub 3 is hidden, behind the monitor, from a user viewing the display screen of the monitor).

In use, a typical embodiment of the inventive apparatus is installed at an endpoint of a teleconferencing system. Such a system is configured to implement a video conference, and comprises nodes (e.g., a teleconferencing server and endpoints) coupled to each other by a link. Each of the endpoints includes apparatus configured to capture audio and video during a video conference and to transmit the captured audio and video (or a processed version thereof) over the link. Each of the endpoints also includes at least one monitor coupled and configured to display conference video (e.g., video, generated at the server and transmitted to the endpoint, and which may be indicative of video captured at any of the endpoints), and audio playback apparatus (e.g., loudspeakers or a head set) coupled and configured to play conference audio (e.g., audio, generated at the server and transmitted to the endpoint, and which may be indicative of audio captured at any of the endpoints). In typical use of the system, users of at least two of the endpoints are participating in a video conference.

While specific embodiments of the present invention and applications of the invention have been described herein, it will be apparent to those of ordinary skill in the art that many variations on the embodiments and applications described herein are possible without departing from the scope of the invention described and claimed herein. It should be understood that while certain forms of the invention have been shown and described, the invention is not to be limited to the specific embodiments described and shown or the specific methods described.

The invention claimed is:

1. An apparatus, including:
a camera mount configured to support a video camera, the camera mount including:
a first structure, including a retainer portion and camera supporting portion, wherein the retainer portion is shaped to engage a surface of an object to which the camera mount is to be mounted, and the camera supporting portion is configured to support the video camera:
a slide, translatably mounted to the first structure; and
a foot, having a first end which is pivotably attached to the slide, said foot including a latch catch element which is spring-biased toward the slide, and a support structure, wherein the support structure is configured to support the latch catch element such that said latch catch element is displaceable away from the slide, relative to the support structure, by overcoming spring-biasing force exerted on the latch catch element; and
a hub, wherein the camera mount and the hub are configured to be detachably mountable with respect to each other in any of at least two different configurations, said configurations including a first configuration in which the camera mount is adjustably mounted to the hub such that the hub and the camera mount, and a video camera mounted to the camera mount, can be stably perched on a monitor having any of a number of different thicknesses.

2. The apparatus of claim 1, wherein the hub has a front surface, a top surface, a rear surface, the hub includes a mount element, the top surface and the mount element are shaped and positioned relative to each other to define a gap therebetween, the gap is sized and shaped to allow mounting of the camera mount to the hub with an element of the camera mount extending through the gap, and wherein the configurations also include a second configuration in which the camera mount is forward-mounted on the hub, and wherein entry into the second configuration includes insertion of said element of the camera mount into the gap in a direction toward the front surface of the hub.

3. The apparatus of claim 1, wherein the hub has a front surface, a top surface, a rear surface, the hub includes a mount element, the top surface and the mount element are shaped and positioned relative to each other to define a gap therebetween, the gap is sized and shaped to allow mounting of the camera mount to the hub with an element of the camera mount extending through the gap, and wherein entry into the first configuration includes insertion of said element of the camera mount into the gap in a direction toward the rear surface of the hub.

4. The apparatus of claim 1, wherein the configurations also include a separated configuration in which the hub does not mechanically support the camera mount and the camera mount does not mechanically support the hub.

5. The apparatus of claim 1, wherein the camera mount includes a camera support structure, and the hub is translatable and pivotable relative to the camera support structure in the first configuration.

6. The apparatus of claim 1, wherein the hub has a top surface, a bottom surface, and a tail portion, and wherein said apparatus also includes:
a wall-mounting element including a tail portion, wherein the hub and the wall-mounting element are sized and shaped so that the wall-mounting element is mountable to the bottom surface of the hub with the tail portion of the hub aligned with the tail portion of the wall-mounting element.

7. The apparatus of claim 1, wherein the camera mount includes a first structure, and a second structure translatably and pivotably attached to the first structure, wherein the first structure includes a camera supporting portion, and wherein the apparatus also includes:
a video camera mounted to the camera supporting portion of the camera mount.

8. A camera mount, including:
a first structure, including a retainer portion and camera supporting portion, where the retainer portion is shaped to engage a surface of an object to which the camera mount is to be mounted, and the camera supporting portion is configured to support a video camera to which the camera mount may be mounted;
a slide, translatably mounted to the first structure; and
a foot, having a first end which is pivotably attached to the slide, said foot including a latch catch element which is spring-biased toward the slide, and a support structure, wherein the support structure is configured to support the latch catch element such that said latch catch element is displaceable away from the slide, relative to the support structure, by overcoming spring-biasing force exerted on the latch catch element.

9. The camera mount of claim 8, wherein the slide and the first structure implement a friction detent subsystem, wherein the friction detent subsystem is configured to exert spring-biasing force which holds the slide, and thus the first end of the foot attached to the slide, in a user-determined position relative to the retainer portion of the first structure, with freedom for the slide to translate toward the retainer portion in response to a closing force sufficiently strong to overcome the spring-biasing force, and with freedom for the slide to translate away from the retainer portion in response to an opening force sufficiently strong to overcome the spring-biasing force.

10. The camera mount of claim 9, wherein the first structure defines racks, each of the racks including detents, the slide includes spring-biased pawls, the friction detent subsystem includes the racks and the pawls, and the pawls are pivotably attached to a main portion of the slide and spring-biased against the racks.

11. The camera mount of claim 10, wherein the racks include a first rack, and a second rack which is at least substantially parallel to the first rack, the pawls include a first pawl which is spring-biased against the first rack, and a second pawl which is spring-biased against the second rack, and wherein the first pawl and the second pawl are shaped, positioned, and spring-biased so as to exert a net torque on the racks.

12. The camera mount of claim 11, wherein the first pawl has a first catch which is spring-biased to engage the first rack, the second pawl has a second catch which is spring-biased to engage the second rack, each of the detents of each of the racks has an asymmetrical shape, and each of the first catch and the second catch has a corresponding shape, such that the slide biases the first pawl and the second pawl against the racks asymmetrically in that a minimum closing force sufficient to cause the slide to translate toward the retainer portion is less than a minimum opening force sufficient to cause the slide to translate away from the retainer portion.

13. The camera mount of claim 8, including:
a hub, wherein the camera mount and the hub are configured to be detachably mountable with respect to each other in any of at least two different configurations, said configurations including a first configuration in which the hub is mounted to the foot of the camera mount such that the hub and the camera mount, and a video camera mounted to the camera mount, can be stably perched on a monitor having any of a number of different thicknesses.

14. The camera mount of claim 13, wherein the hub has a front surface, a top surface, a rear surface, the hub includes a mount element, the top surface and the mount element are shaped and positioned relative to each other to define a gap therebetween, the gap is sized and shaped to allow mounting of the camera mount to the hub with the foot of the camera mount extending through the gap, and wherein the configurations also include a second configuration in which the camera mount is forward-mounted on the hub, and wherein entry into the second configuration includes insertion of the foot of the camera mount into the gap in a direction toward the front surface of the hub.

15. The camera mount of claim 13, wherein the hub has a front surface, a top surface, a rear surface, the hub includes a mount element, the top surface and the mount element are shaped and positioned relative to each other to define a gap therebetween, the gap is sized and shaped to allow mounting of the camera mount to the hub with the foot of the camera mount extending through the gap, and
wherein entry into the first configuration includes insertion of the foot of the camera mount into the gap in a direction toward the rear surface of the hub.

* * * * *